Patented Jan. 2, 1945

2,366,414

UNITED STATES PATENT OFFICE 2,366,414

PROTECTIVE COATINGS FOR ARTICLES

Gunnar Lindh, Detroit, Mich., assignor to The Udylite Corporation, Detroit, Mich., a corporation of Delaware No Drawing. Application May 29, 1942,
Serial No. 445,011

5 Claims. (Cl. 260—42)

This invention relates to protective coatings for articles and more particularly to protective coatings for articles useful in performing chemical processes such as liquid chemical dips, electrochemical cleaning, electroplating, chemical oxidation, phosphatizing, chromatizing, etc.

Machines and parts thereof used in chemical treatment are corroded or otherwise affected by the chemical treatment. For example, work holding racks and tanks for the electrolytes used in electrodeposition of metal are corroded by reacting with the electrolytes and metal is deposited on the racks and tanks. It is the object of this invention to produce a protective coating for such machines and machine parts which will effectively protect the same against reactive contact with the chemicals, either gaseous or liquid, used in well-known chemical treating processes.

This object has been achieved by coating the machine or machine parts with a protective film comprising a mixture of a polymethacrylic acid ester and a co-polymer of vinylidene chloride and vinyl chloride.

It is the purpose of this invention to provide coatings of great hardness and wear resistance combined with considerable flexibility and having a high chemical resistance, especially to such solutions as are used in the plating art.

This invention also contemplates a coating having good adhesion to metal.

Very hard and adherent coatings are produced with polymethacrylates alone and especially with polymethyl methacrylate, particularly when the coatings are subjected to heat, for example, for 20 minutes at 300° F. or one hour at 250° F. However, such coatings tend to be brittle and cannot be used for many purposes. The need for a plasticizer is indicated.

The common commercial plasticizers such as dibutyl phthalate and tricresyl phosphate, when added to the methacrylate, does remove the extreme brittleness of the baked resin coating. However, they also adversely affect the chemical resistance of the coating.

I have found that co-polymers of vinylidene chloride and vinyl chloride, such as manufactured by The Dow Chemical Company under the trade name "Saran B," are excellent plasticizers for polymethacrylate coatings without affecting adversely the chemical resistance offered by them.

The amount of vinylidene chloride-vinyl chloride co-polymer is limited to about 25% of the total resin content because larger amounts cause the coating to lose some of its adhesion and considerable of its hardness, making it generally unsuitable for coatings on metal articles.

I am familiar with the fact that vinylidene chloride and esters of methacrylic acids have been co-polymerized in reaction kettles to provide a resinous composition, subsequently dissolved in solvents as shown in United States Patents Nos. 2,160,945, 2,249,915, 2,249,916 and 2,249,917.

My material differs from these in that I do not co-polymerize the methacrylic acid ester with the vinylidene chloride but use a mixture of already polymerized methacrylic acid ester and already co-polymerized vinylidene chloride and vinyl chloride.

There is no precise lower limit to the amount of the vinylidene chloride-vinyl chloride co-polymer. Naturally, when a very small amount is added, the plasticizing effect is small. Though some effect may be noted with as little as 1%, for my purposes I prefer to use at least 5% and generally about 15-20%.

Polymethacrylates are soluble in inexpensive solvents such as toluol, xylol and esters such as ethyl-, butyl- and amyl acetates. My plasticizer, however, is insoluble in the aromatic naphthas and only slightly soluble in the esters. It is soluble in ketone type solvents such as acetone, methyl ethyl ketone, methyl isobutyl ketone and cyclohexanone, ethers such as dioxane and iso-propyl ether and chlorinated ethylene compounds such as ethylene dichloride. Hence, it is desirable to add ketones, ethers or chlorinated ethylene compounds to the solvents when my plasticizer is employed. I have also found that while Saran B is not completely soluble in nitroparaffins, these solvents, for example, 1- or 2-nitro-propane, can be used with other solvents when coatings containing relatively small amounts of Saran B are employed.

The following combinations have proven very satisfactory:

| Total solids, per cent by weight | Solids composition, per cent by weight | | Total solvents, per cent by weight | Solvent composition, per cent by weight | | | | | |
|---|---|---|---|---|---|---|---|---|---|
| | Polymethyl-methacrylate | Saran B | | Toluol | Xylol | Ethyl acetate | Butyl acetate | Methyl ethyl ketone | 1-nitro-propane |
| 27 | 89 | 11 | 73 | 61 | 6 | --------- | --------- | 6 | 27 |
| 30 | 80 | 20 | 70 | 60 | 14 | --------- | 9 | 17 | --------- |
| 31 | 80 | 20 | 69 | 54 | --------- | --------- | --------- | --------- | 46 |
| 35 | 78 | 22 | 65 | 75 | --------- | 12 | --------- | 4 | 9 |
| 35 | 78 | 22 | 65 | 62 | --------- | --------- | 28 | --------- | 10 |

In coating a rack for electrochemical processing and the like, I proceed as follows: The coating solution is kept in a container and the rack is lowered into it sufficiently slowly that air be not entrapped with the coating. The rack is then withdrawn at a low rate of speed, approximately ½ in. to 1 in. per minute. Any drops of coating material adhering to the lower end are easily wiped off with a stick, and the coating re-forms rapidly over this area because of its high surface tension. The rack is now allowed to air dry for about one hour or force dry, for example, at 225° F., for twenty minutes.

Subsequent coatings are then applied in the same manner until the required total thickness is obtained. Every other coating application is made with the rack turned upside-down to equalize the distribution of the coating. Six coatings are sufficient for most ordinary purposes. For best results, force drying at a temperature of about 200–225° F. for about two hours or more is employed after the final coating has been applied.

As the solvents are evaporated, the hardness and adherence increase to maximum. No further increase in hardness takes place because of oxidation, and the coating stays flexible and does not crack during use.

Tanks and similar containers which on account of their size, cannot be dipped, are best coated by spraying. A thin coating is applied at a time and dries sufficiently quickly so that when the whole object has been given one coat, it is usually ready for another coating.

These coatings have shown an unusual and unexpected resistance to the action of chemicals used in the plating art. Thus, for example, coatings of my material $\frac{1}{16}''$ thick withstood immersion in a standard chromium plating solution containing 33 oz. per gal. of chromic acid and .33 oz. per gal. of sulphuric acid, operated at a temperature of 110° F. continuously for twenty-four hours without showing any evidence of attack or change of any sort. The same coating was immersed for the same length of time in an alkaline cleaning solution containing about 12 oz. per gal. of a mixture of sodium phosphates, sodium silicates and caustic soda at 210° F. without showing any change in properties. Other coatings heretofore used, applied in the same thicknesses, were definitely inferior in some respect or another. Thus, for example, a coating consisting of a co-polymer of vinyl chloride, styrene and vinyl acetate completely lost adhesion in the above-mentioned alkaline cleaner test. A co-polymer of vinyl chloride and vinyl acetate lost much adhesion and became embrittled during the same test. Other commonly used rack coatings of unknown composition corroded rapidly in the alkaline cleaner. Cellulose and rubber coatings which I tried were rapidly attacked by the chromic acid bath, being dissolved in the bath and causing a reduction of hexavalent chromium to trivalent chromium.

My coating has also been used in other solutions such as cyanide plating solutions and bright nickel plating solutions as well as acid pickling solutions. A remarkable chemical resistance and absence of hardening and cracking has been demonstrated. No change in adhesion has been noticed.

Compared to the coatings described in my co-pending application Serial No. 441,478 and comprising mixtures of vinylidene chloride-vinyl chloride co-polymers and finely divided silicious material, my present coating is much harder and has a somewhat less perfect adhesion. By the addition of finely divided silicious material, the adhesion of my present coating can be increased further.

I claim:

1. An article adapted for use in performing a chemical process having a hard protective coating of high chemical resistance, good adhesion and wear resistance, comprising essentially a mixture of polymethacrylic acid ester and a co-polymer of vinylidene chloride and vinyl chloride, the said co-polymer of vinylidene chloride and vinyl chloride being present in said mixture in an amount falling within a range of from about one percent (1%) to about twenty-five percent (25%) of the total resin content.

2. An article adapted for use in performing a chemical process having a hard protective coating of high chemical resistance, good adhesion and wear resistance, comprising essentially a mixture of polymethacrylic acid ester and a co-polymer of vinylidene chloride and vinyl chloride, the said co-polymer of vinylidene chloride and vinyl chloride being present in said mixture in an amount falling within a range of from five percent (5%) to twenty percent (20%) by weight of the total resin content.

3. An article adapted for use in performing a chemical process having a hard protective coating of high chemical resistance, good adhesion and wear resistance, comprising essentially a mixture of polymethyl-methacrylate and a co-polymer of vinylidene chloride and vinyl chloride, the said co-polymer of vinylidene chloride and vinyl chloride being present in said mixture in an amount falling within a range of from about one percent (1%) to about twenty-five percent (25%) of the total resin content.

4. An article adapted for use in performing a chemical process having a hard protective coating of high chemical resistance, good adhesion and wear resistance, comprising essentially a mixture of polymethyl-methacrylate and a co-polymer of vinylidene chloride and vinyl chloride, the said co-polymer of vinylidene chloride and vinyl chloride being present in said mixture in an amount falling within a range of from five percent (5%) to twenty percent (20%) by weight of the total resin content.

5. A coating solution comprising essentially a mixture of polymethacrylic acid ester and a co-polymer of vinylidene chloride and vinyl chloride, the said co-polymer being present in said mixture in an amount falling within a range of from about one percent (1%) to about twenty-five percent (25%) of the total resin content, a solvent for the ester and a solvent for the said co-polymer.

GUNNAR LINDH.